United States Patent [19]
Walker

[11] Patent Number: 5,692,676
[45] Date of Patent: Dec. 2, 1997

[54] METHOD AND APPARATUS FOR SAVING ENERGY IN CIRCULATING HOT WATER HEATING SYSTEMS

[76] Inventor: Robert Walker, 230 Parkview Dr., Pawtucket, R.I. 02861

[21] Appl. No.: 697,559

[22] Filed: Aug. 28, 1996

[51] Int. Cl.$^6$ ............................................. F24D 3/00
[52] U.S. Cl. ..................... 237/8 R; 237/8 C; 237/19; 236/91 F
[58] Field of Search ................... 237/8 R, 8 C, 237/19; 236/91 F

[56] References Cited

U.S. PATENT DOCUMENTS

| | | |
|---|---|---|
| 1,874,971 | 8/1932 | Hall et al. . |
| 1,952,475 | 3/1934 | Tidd . |
| 2,061,605 | 10/1936 | Yoder . |
| 2,137,024 | 11/1938 | Moore et al. . |
| 2,267,165 | 12/1941 | Parsons . |
| 2,581,525 | 8/1952 | Gaddis . |
| 2,735,622 | 2/1956 | Pintarelli . |
| 3,424,377 | 1/1969 | Steghart et al. . |
| 4,189,097 | 2/1980 | Flynn et al. ............... 237/8 R |
| 4,433,810 | 2/1984 | Gottlieb ..................... 237/8 R |
| 4,522,333 | 6/1985 | Blau, Jr. et al. ............ 236/91 F |
| 4,620,667 | 11/1986 | Vandermeyden et al. ..... 236/91 F |
| 4,623,093 | 11/1986 | Arndt ........................ 237/19 |
| 4,844,335 | 7/1989 | McKinley et al. .......... 237/8 R |
| 5,504,306 | 4/1996 | Russell et al. ............. 237/19 |

Primary Examiner—Henry A. Bennett
Assistant Examiner—Derek S. Boles
Attorney, Agent, or Firm—Fisher, Christen & Sabol

[57] ABSTRACT

A method for automatically adjusting the temperature of the boiler water in a hot water heating system in proportion to changes in the heat demand rate in the space heated by the boiler water wherein the change in heat demand rate is established on the basis of the off-time interval in the cyclic off and on activation of the pump which circulates the boiler water through heat radiators in the space being heated. The circulating pump off times are measured, and the boiler water temperature is continuously measured. The change in space heat demand rates is calculated by calculating the change in the length of the off-time intervals of the circulating pump. The boiler water control circuits are activated to adjust the boiler water temperature control set points upward or downward in direct proportion to the change in the calculated space heat demand rate. Apparatus for conducting the method.

9 Claims, 3 Drawing Sheets

METHOD AND APPARATUS FOR SAVING ENERGY IN CIRCULATING HOT WATER HEATING SYSTEMS

BACKGROUND OF THE INVENTION

1. Field of the Invention

The invention relates to the automatic control of the boiler water temperature in hot water space heating systems in residential and commercial buildings.

2. Background Art

Hot water heating systems in buildings provide heat to the heated zones by circulating hot water from a boiler or other heating means through radiating structures located throughout the building. The temperature in a heated zone (or zones) is controlled by means of a thermostat which senses the zone temperature and cycles the hot water circulating system on and off to control the temperature around the thermostat set point. The temperature of the hot water is controlled by a separate aquastat which maintains the water temperature sufficiently high to provide heat over a wide range of demand rates. The boiler water temperature is maintained between high and low set points by action of the aquastat. As heat is being drawn out of the boiler during circulating periods, the water temperature will begin to decrease as heat is dissipated through the radiating structures. When the water temperature drops to the low set point, the aquastat will activate the water heating means (e.g., the burner in a boiler system) and maintain it active until the water temperature reaches the high set point at which time the heating means is deactivated.

In a given structure, the rate of heat loss in the heated air space of the structure will vary directly with the difference between the inside temperature set by the thermostat and the outdoor temperature. Stated otherwise, the demand for heat from the hot water increases with increasing difference between the indoor and outdoor temperatures. Consequently, the water temperature required to maintain a given inside temperature can be lowered during periods of warm weather and increased during periods of cold weather. Therefore, the high and low temperature set points of the hot water control can be adjusted in proportion to the demand rate determined by the difference between the indoor and outdoor temperatures. Numerous methods have been devised to automatically control the circulating hot water temperature in heating systems by means of measuring a parameter proportional to the demand rate such as the difference between the indoor and outdoor temperatures or some other indirect measurement of the demand rate.

U.S. Pat. No. 1,874,971 (Hall et al.) shows a method for controlling the flame of a gas burner providing the heat input to a heating system in order to ". . . provide for maintaining a low or moderate flame in the burner in moderate weather and a high or full flame in the burner in cold weather, and turning off all gas except for the pilot when the weather is so warm that no heat is required". Control is based upon the use of a two-element thermostat sensor controlling two orifices to a gas burner arranged such that the rate at which a second orifice is opened is determined by the rate at which the temperature sensor is switching. It is in essence an automatic temperature control based on demand as well as temperature. A shortcoming of this method is that implementation in an existing heating system requires installation of a new two-orifice gas control device and modifications to the existing burner controls.

U.S. Pat. No. 2,137,024 (Moore et al.) discloses an automatic heating control system which ". . . is particularly applicable to systems in which the supply of heating medium is turned on or shut off, or checked and released at frequent intervals so that the amount of heat supplied to the system is determined by the proportion of elapsed time occupied by the intervals of supply of the heat medium". A programmed film strip is used to control heat supply based upon the measurement of both the indoor and outdoor temperatures and the predetermined (programmed) desired indoor conditions. A shortcoming of this method is that implementation requires the installation and wiring of an outdoor temperature sensor and cumbersome programmed film strips.

U.S. Pat. No. 2,581,525 (Gaddis et al.) describes a method of controlling a number of elements in a heating system based on both the temperature and the demand rate. Implementation requires utilization of a "heat demand indication device . . . which has a voltage output representative of the amount of heat that must be supplied to maintain a constant temperature within a given space". No details on either the existence or design of such devices are presented. Given such a device, electronic circuits measure the rate of charge on capacitors in response to the output of the heat demand indicating device thereby producing outputs proportional to demand which are used to control the number of heating elements in operation.

U.S. Pat. No. 3,424,377 (Steghart et al.) deals with a complex general temperature control system based upon a motor control device actuated by a control thermostat of unique design in such a way that a feedback signal from the current supplied to a motor winding is essentially proportional to demand. The feedback signal is proportional to the cyclic interval of the thermostat, and the motor which provides that signal also serves to actuate a control valve in a heating system. Implementation in an existing hot water heating system would require installation of a unique thermostat and replacement of the existing circulating pump motor.

A boiler control system for controlling hot water heating systems on a demand basis in response to change in the outdoor temperature is currently offered by Tekmar Control Systems, Inc, The Model 250 Boiler Control utilizes an added outdoor temperature sensor connected to a control module along with a temperature sensor connected on the hot water supply. The control routine is implemented on the basis of manually adjusting a "heating curve" programmed into the system. A shortcoming of this system is the requirement for the installation of two additional temperature sensors and the necessity for the user to experiment, by trial-and-error, over a period of a few weeks or months in order to properly adjust the heating curve for maximum energy saving.

BROAD DESCRIPTION OF THE INVENTION

An object of the invention is to provide apparatuses and methods for automatically controlling the temperature of the water in a hot water heating system on a demand basis in such a manner as to adjust the average boiler water temperature in proportion to heating demand thereby providing significant energy savings during periods of low heat demand. Furthermore, another object of the invention is realized with apparatus which can be installed in existing heating systems without the need for replacement or modification of existing thermostatic devices or installation of outdoor temperature sensors. Advantages afforded by the invention include (1) simplicity of installation, (2) a single apparatus which is amenable to multiple inputs and outputs, and (3) the system being self calibrating and requiring no special skills for installation or operation. Other objects and advantages of the invention are set out herein or are obvious herefrom to one skilled in the art.

The objects and advantages of the invention are achieved by the methods and apparatuses of the invention.

The invention includes the automatic control of the boiler water temperature in hot water space heating systems in residential and commercial buildings in a manner which automatically compensates for changes in heat demand rates due to changes in the outdoor temperature. As the demand rate decreases with increasing outside temperature, the boiler water temperature is automatically reduced proportionately thereby resulting in energy savings through reduced fuel consumption during the periods of lower demand rate.

None of the prior art methods or apparatuses cited above teaches or suggests the methods and apparatuses of the invention. The invention overcomes the shortcomings and/or disadvantages noted for such prior art.

The method of the invention is based upon obtaining a measure of the heating demand rate by electronically monitoring the off/on cyclic intervals of the water circulating pump and the boiler water temperature, calculating the demand rate from the pump cycle off-time intervals and adjusting the boiler water temperature to a level no higher than necessary to meet the current demand rate. For a given structural heat loss rate and indoor thermostat setting, the pump "off" time will be inversely proportional to the heat demand rate. A measure of the average "off" time therefore provides the parameter for the desired control.

The control apparatus incorporates a central processing unit (CPU) which activates the boiler on/off controls on the basis of inputs of the circulating pump off/on cycles and boiler water temperature. The central processing unit is preprogrammed to calculate the running average of the pump "off" time. Based upon that number and the continuous measurement of the boiler water temperature, the central processing unit cycles the boiler control on and off between two temperatures, for example, over a 20° F. temperature band, with the upper and lower temperature levels adjusted upward or downward on the basis of heat demand; i.e., the 20° F. band is shifted up and down in proportion to demand.

In the case where a separate domestic, sanitary, potable or other hot water supply (HWS) is also indirectly heated by the boiler water (as in a typical domestic dwelling), the hot water supply circulating pump on/off cycles are also inputted to the central processing unit. The purpose of this scheme is to provide an adequate boiler water temperature for heating the hot water supply during periods of low space heat demands at which time the boiler water temperature could be too low to satisfy the hot water supply temperature requirements.

The invention involves a method for automatically adjusting the temperature of the boiler water in a hot water heating system in proportion to changes in the heat demand rate in the space heated by the boiler water wherein the change in heat demand rate is established on the basis of the off-time interval in the cyclic on and off activation of the pump which circulates the boiler water through heat radiators in the space being heated. The method includes: measuring the circulating pump off times; continuously measuring the boiler water temperature; calculating the change in space heat demand rates by calculating the change in the length of the off-time intervals of the circulating pump; and activating the boiler water control circuits to adjust the boiler water temperature control set points upward or downward in direct proportion to the change in the calculated space heat demand rate.

Preferably the measurement of the circulating pump off time interval is obtained as an electrical signal within the circulating pump control system which can be any one of the following:

(a) the opening and closing of the electrical contacts of the thermostat in the heated space which activates the pump off/on control;

(b) the voltage input or output from any intermediate device connected between the thermostat contacts and the circulating pump motor, e.g., a control relay or other electrical actuator;

(c) the voltage applied directly to the circulating pump motor leads to actuate the pump on and off.

Preferably the boiler water temperature is continuously measured and monitored by means of a conventional temperature sensor installed on the boiler such as to be in direct contact with the boiler water, or any surface in the boiler water delivery system which is at the same temperature as the boiler water, and the output of the temperature sensor is an electrical signal, current or voltage, which is directly proportional to the boiler water temperature. Preferably the electrical signals corresponding to the measured off-time intervals of the circulating pump and the boiler water temperature are provided as inputs to an electronic control system in which changes in space heat demand rate are calculated and new boiler water temperature set points calculated in terms of the calculated change in the space heat demand and the measurement of the instantaneous boiler water temperature. Preferably the outputs of the electronic control system are two control signals, being the upper and lower boiler water temperature set points, which are fed to the control circuits of the boiler burner to control the burner on/off cycles such as to maintain the boiler water temperature within the set points calculated for the space heat demand rate at any point in time. Preferably there is a separate control loop to maintain the temperature of a separate hot water supply which is indirectly heated by the boiler water at any predetermined range even during periods of very low space heat demand during which the boiler water temperature may be below the minimum desired for the separate hot water supply.

The invention involves a control system for automatically adjusting the temperature of the boiler water in a hot water heating system in proportion to changes in the heat demand rate in the space heated by the boiler water wherein the change in heat demand rate is established on the basis of the off-time interval in the cyclic on and off activation of the pump which circulates the boiler water through heat radiators in the space being heated. The control system includes: means to measure the circulating pump off times; means to continuously measure the boiler water temperature; means to calculate the change in space heat demand rates by calculating the change in the length of the off-time intervals of the circulating pump; and means to activate the boiler water control circuits to adjust the boiler water temperature control circuits to adjust the boiler water temperature control set points upward or downward in direct proportion to the change in the calculated space heat demand rate.

Preferably the control system, for implementation in an existing or newly installed hot water heating system, includes: an electronic control module having two inputs which are electrical signals indicative of (1) the circulating pump off time interval and (2) the instantaneous boiler water temperature; and two output control signals to the existing boiler burner control circuits which serve to fire the boiler burner on and off such as to maintain the boiler water temperature between the upper and lower temperature set points calculated in the electronic control module on the basis of the instantaneous space heat demand rate as determined by the measured changes in the circulating pump off-time intervals. Preferably the electronic control module is a self-contained unit in a single enclosure which includes: a central processing unit (CPU) which comprises digital and/or analog circuits and which is preprogrammed to cocalculate continuously changes in the off-time intervals of the hot water circulating pump and the boiler water temperature and therefrom calculate the maximum boiler water temperature set points which are sufficient to satisfy the instantaneous space heat demand rate; isolation circuits which electrically isolate the control module circuits from the circulating pump control circuits; signal conditioning circuits which convert the outputs from the aforementioned isolator circuits to signal levels (voltages or currents) compatible with the specific design for the central processing unit; temperature interface circuit to convert the output from the boiler water temperature sensor to a signal (voltage or current) proportional to boiler water temperature; a power supply to convert an AC voltage from an external power source to a DC voltage compatible with the requirements of the central processing unit and all other circuitry in the electronic module; electrical driver circuits to provide drive power to control relays or switches operated from the low-power central processing unit; and relays or switches which provide command signals to the boiler controls at the new temperature set points. Preferably there is a separate control loop to maintain the temperature of a separate hot water supply which is indirectly heated by the boiler water at any predetermined range even during periods of very low space heat demand during which the boiler water temperature may be below the minimum desired for the separate hot water supply.

DETAILED DESCRIPTION OF THE INVENTION

Figure 1:
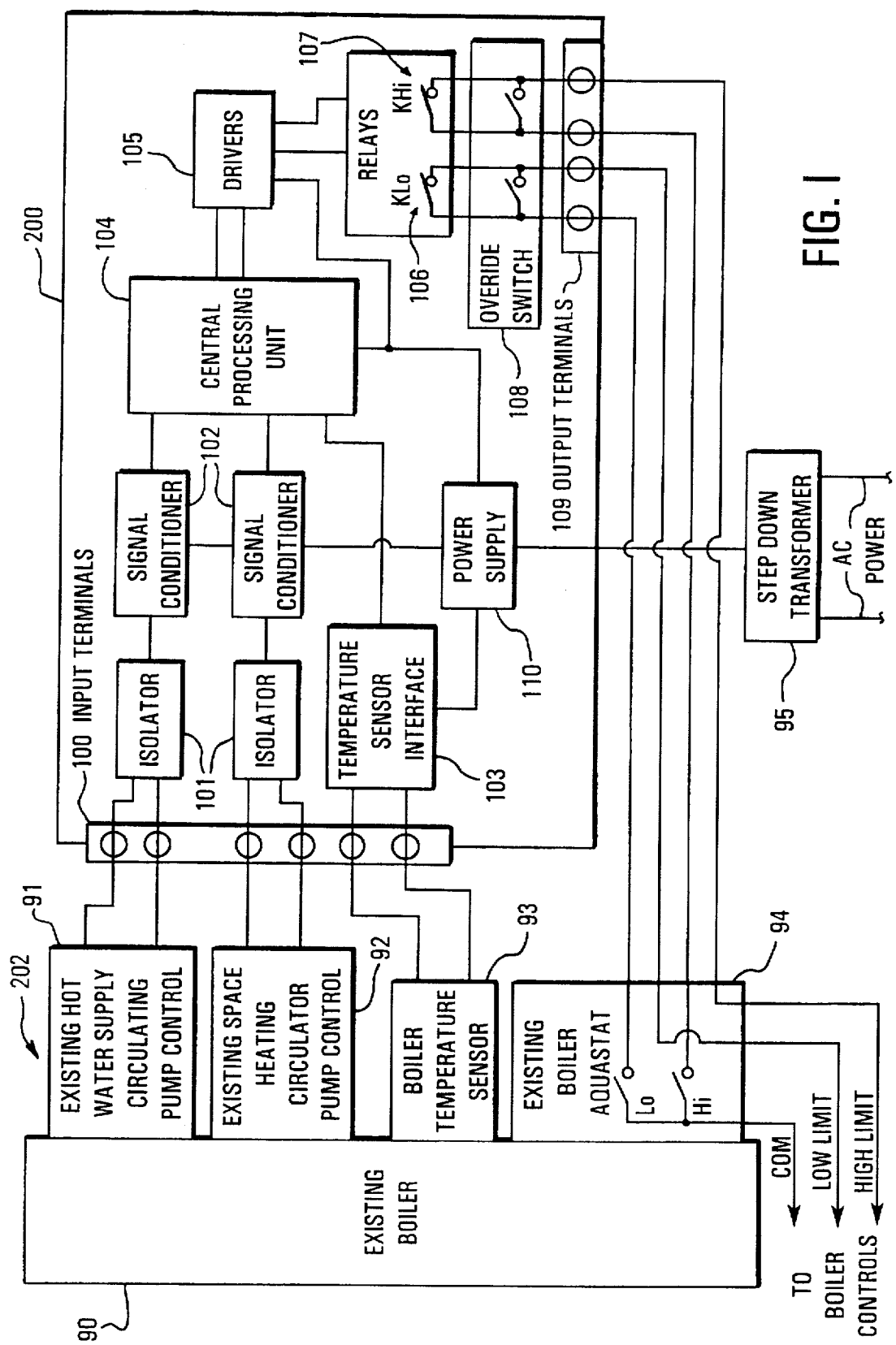
FIG. 1 shows the apparatus of the invention connected into an existing basic hot water heating system which could also include a separate hot water supply heated by the boiler water.

FIG. 1 shows the apparatus of the invention 200 installed and/or connected to a typical existing hot water heating system 202 which comprises a boiler 90, hot water supply circulating pump control 91, space heating circulating pump control 92, and a boiler water aquastat 94. An additional boiler water temperature sensor 93 must also be installed for use in conjunction with the apparatus 200. The apparatus 200 is self contained in a single enclosure and is connected to the existing heating system through input terminals 100 and output terminals 109, either or both of which can be any suitable electrical connector, such as, screw terminals, multiple-pin in-line connectors or soldering posts for direct hard wiring into the system. Electrical power is supplied to the apparatus 200 by means of an external, step-down AC transformer 95 which transforms the available AC supply (typically 120 or 240 volts AC in residential or commercial buildings) to a lower AC voltage in the range of 6 to 12 volts AC.

The low-voltage output of the step-down transformer 95 is connected to an internal power supply 110 in the apparatus 200. The power supply 110 converts the AC voltage to a DC voltage level typically in the range of 5 to 9 volts DC for compatibility with the requirements of all other components or subassemblies in the apparatus 200. The power supply 110 can be any ordinary rectifier such as industry standard LM7800 series and filter capacitor for conversion of the AC to the required DC voltage or conventional off-the-shelf AC to DC converter such as a Cosel USA Inc. Model YS505.

The space heating and hot water supply circulating pump controls 91 and 92 provide input signals to electrical isolator circuits 101 in the apparatus 200. The signals obtained from the pump controls 91 and 92 are of any form indicative of the pump on/off action and could be either the voltage directly across the pump relay, the voltage applied directly across the pump motor, a single contact closure from the control relay or the thermostat on/off contacts directly in the pump control systems 91 and 92. Isolators 101 serve to convert the signals from the pump controls to an electrical format which can be conditioned for compatibility with the central processing unit (CPU) 104 via signal conditioners 102. For the case where the signal from the pump controls 91 or 92 are the AC voltage across either the pump control relay or pump motor, the isolators 101 can be simple optoisolators such as Motorola type AV11A or AC input/DC output devices such as Teledyne Model C76Al-1. The signal conditioners 102 serve to convert the on/off signal from the pump controls 91 and 92 to an on/off voltage signal with the voltage level matched to the requirements of the central processing unit 104. In the case where the isolators 101 are optoisolators, the signal conditioners 102 are simple resistors connected between the power supply 110 and the open collector outputs of the optoisolators 101. It is obvious to one skilled in the ordinary electrical control arts that any one of numerous conventional schemes incorporating miniature, low-cost, off-the-shelf devices can be implemented to perform the function of receiving a signal indicative of pump on/off from the existing pump control systems and converting those signals to a voltage signal compatible with the specific requirements of all the subassemblies within the apparatus 200.

The boiler water temperature sensor 93 is any suitable temperature sensor which in combination with the temperature interface circuit 103 will provide a voltage signal to the central processing unit 104 which is directly proportional to the boiler water temperature. A preferred device for this is an ordinary thermocouple or thermistor sensor readily available from numerous sources but any other type of off-the-shelf temperature sensor such as integrated circuit temperature sensor, Analog Devices Type AC2626 would suffice for the purpose of the invention. The temperature interface circuit 103 is an ordinary circuit used in conventional temperature measuring apparatus which produces an analog output voltage directly proportional to boiler water temperature. It is obvious to one skilled in the ordinary electrical control arts that any one of numerous conventional schemes incorporating miniature, low-cost, off-the-shelf devices can be implemented to perform the function of sensing the boiler water temperature and providing an analog voltage to the central processing unit 104 which is proportional to the boiler water temperature.

The central processing unit 104 is a microcomputer or microcontroller with three inputs as described above and two outputs which control the boiler 90 water temperature as described below. The central processing unit 104 can be a single microprocessor having multiple digital input and output terminals along with a single analog-to-digital signal converter such as a Microchip Technology Inc. Series PIC 16C or a combination of separate conventional programmable microprocessor and analog-to-digital converter or a complete microcomputer such as a Wintek Corporation Series MCHxy. The function of the central processing unit 104 is to continuously calculate the space demand rate on the basis of the measured off-time intervals of the space heat circulating pump and adjust the boiler water temperature set points in proportion to the space heat demand rate. This is accomplished in the software of the central processing unit 104 by calculating the length of each pump off-time interval, comparing that length to the previous one or more off-time intervals and therefrom calculating a correction factor which is used to adjust the boiler water temperature set points up or down in direct proportion to the average off-time intervals over the number of measured intervals.

During periods of very low demand rates, the boiler water temperature may be at a level which is too low for the requirements of the separate hot water supply (HWS). Under that condition, the central processing unit 104 will reset the temperature set points to, for example, a 20° F. band (e.g., 130° to 150° F. in a typical domestic residence) with the minimum set point at the temperature desired for the hot water supply whenever the hot water supply circulating pump comes on when the boiler water temperature is lower than the desired minimum for the hot water supply, then returns to space heating values. When the HWS (hot water supply) circulating pump turns off, the control system reverts back to the hot water temperature control for adjustments based on space heat demand rate.

The central processing unit 104 provides an output which adjusts the boiler water high and low temperature set points by means of two relays 106 and 107, each of which normally has closed output contacts (designated as KLo and KHi, respectively) connected in series with the high and low set temperature set point contacts of the existing boiler water aquastat 94. An ordinary, double-pole, single-throw override switch 108 is connected directly across the output contacts. When switch 108 is closed, the contacts of the relays 106 and 107 are short circuited and operation of the boiler control system is restored to its normal mode without any automatic control provided by the apparatus 200. The opening switch 108 puts the boiler under control by the apparatus of the invention, 200.

The energizing coils of the relays 106 and 107 are activated from the central processing unit 104 via the driver 105, the function of which is to provide switching of the relatively high relay currents through the relay coils from the power supply 110 with a low current drain output from the central processing unit 104. A common arrangement for the driver would be a pair of simple open-collector transistors which are switched on through a low current output base from the central processing unit 104. It is obvious to one skilled in the ordinary electrical control arts that any one of numerous conventional schemes incorporating miniature, low-cost, off-the-shelf devices can be implemented to perform the function of driving the relatively high-current coils for the relays 106 and 107 with low-current outputs from the central processing unit 104.

The relays 106 and 107 set the low and high (respectively) boiler water temperature set points under control of the central processing unit 104. In operation, the high and low temperature set points of the existing aquastat 94 are set to their maximum levels, typically 180° F. and 160° F., respectively, in conventional hot water heating systems. The central processing unit 104 establishes new high and low set points based on changes in space heat demand rate and adjusts the set points over a range of 110° to 180° F. maintaining the temperature differential band between on/off cycles of 20° F. The central processing unit will operate such as to maintain the maximum temperature set points at the 160° F. to 180° F. maximum range (as set on aquastat 94) under conditions of maximum demand and lower the set points to a range of 110° F. to 130° F. during periods of very low demand and continue to adjust the set points upward and downward in one degree increments (maintaining the 20 degree differential band between the lower and upper points) in response to changes in demand as calculated by the central processing unit 104 on the basis changes in off-time intervals of the circulating pump control 92.

DESCRIPTION OF OPERATION

Figure 2:
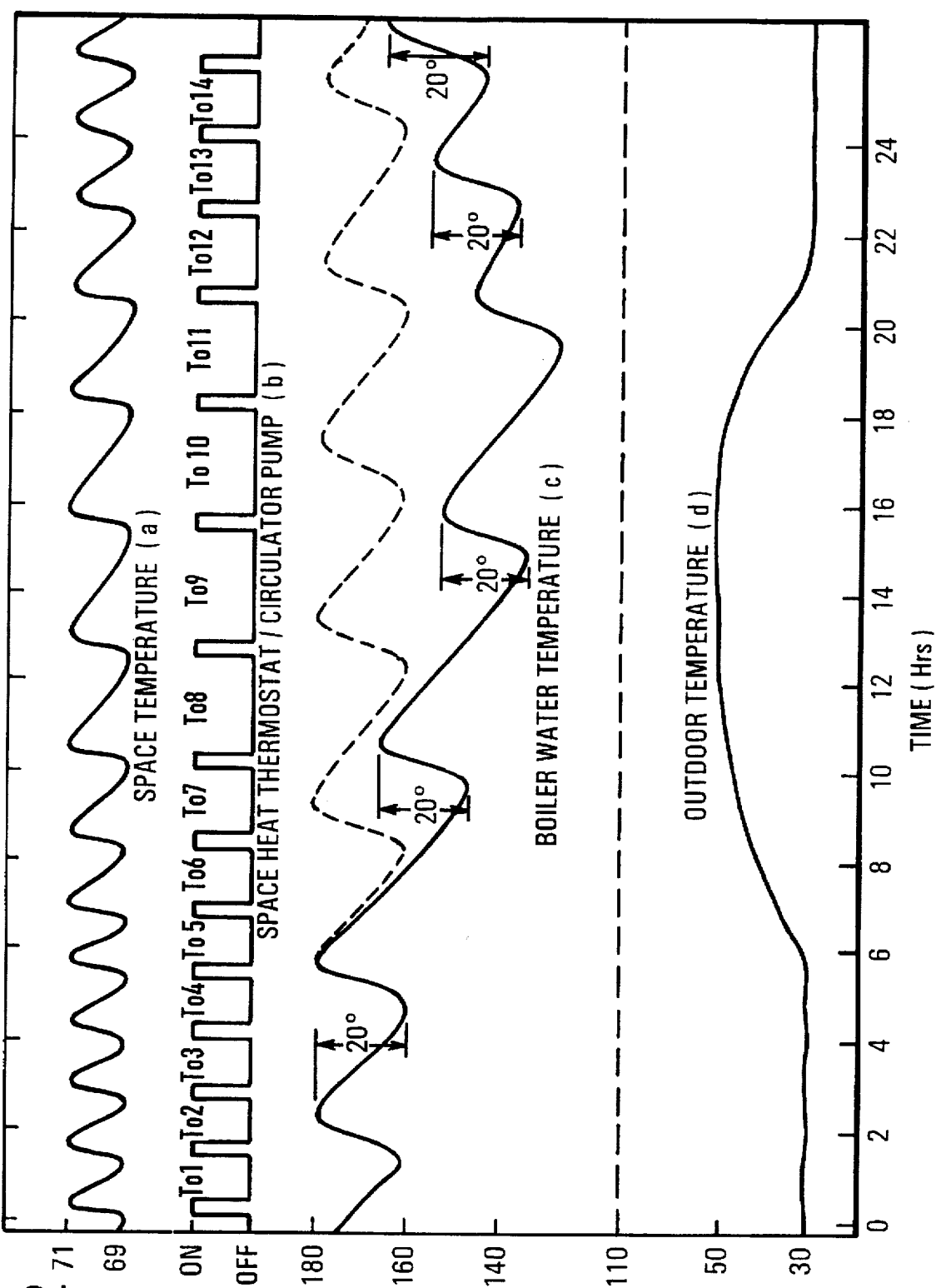
FIG. 2 illustrates, by way of example, typical operating conditions over a 24-hour period in a typical domestic dwelling over a period of time during which the outside temperature changes over a significant range, both with and without the control apparatus of the invention.

FIG. 2 illustrates conditions representative of a typical hot water space heating system. FIG. 2(a) is the curve of the inside space air temperature which is controlled by a thermostat in the heated space which, for this example, is set for 70° F. The thermostat switches on and off between two points slightly above and below the set point, the two points for this example being one degree Fahrenheit either side of the set point. The on/off thermostat action is shown by curve 2(b).

When the space temperature falls to the low set point, the thermostat switches on and activates the boiler water circulating pump to deliver hot water from the boiler to the radiators in the heated space causing the space temp to increase at a rate depending upon the heat transfer characteristics of the radiators and the structure. When the space temperature reaches 70° F., the thermostat switches the circulating pump off and the space temperature will begin to drop as heat is lost from the space to the outdoors.

For a given structure, the rate at which the space temperature will decrease following shut-off of the circulating pump is directly proportional to the difference between the inside space temperature and the outdoor temperature. The smaller that temperature difference is, the longer the time required for the space temperature to fall to the low set point and again switch on the circulating pump. The off-time intervals are represented by To1, To2, . . . To14 in 2(b). In this example, the outside temperature is shown in curve 2(d) increasing from 30 to 50 degrees over a period of time which is much longer than any one pump off/on interval. During the first four intervals, the outside temperature is nearly constant and the four off-time intervals, To1 to To4, are nearly equal. As the outside temperature increases, the rate of heat loss from the space decreases resulting in increasing off-time intervals as shown with To7>To6>To5>To4. Following the tenth interval, the outside temperature begins to decrease resulting in decreasing off-time intervals thereafter with To12<To11<To10.

In a typical heating system, the boiler water temperature is maintained between two limits by action of an aquastat having two set points, typically 160° F. and 180° F. in residential structures. The boiler water temperature is independent of the space heating control and must be maintained high enough to provide sufficient heat under conditions of high heat demand in very cold weather. For the typical conventional system of this example, the boiler water temperature variations over time cycles between the two fixed set points are shown as the dotted trace in FIG. 2(c).

When the outside temperature increases in warm weather, the boiler water temperature may be reduced from the higher level required in the colder weather without loss of ability to deliver sufficient heat to the heated space. Reduction of the boiler water temperature yields significant energy savings since the heat loss from boiler to its surroundings is proportional to the difference in temperature of the boiler water and the temperature of the boiler surroundings.

The apparatus of the invention provides for automatic adjustment of boiler water temperature in proportion to heat demand rate of the heated space based upon measuring and storing the length of the circulating pump (or thermostat) off-time intervals and calculating the change in heat demand (increasing or decreasing) therefrom. The boiler water temperature is then increased or decreased in proportion to the heat demand as indicated by changes in the off-time intervals. Each off-time interval, ToX, is compared to the previous interval, To(X−1), and a correction factor for boiler water temperature calculated such that the magnitude of the correction is proportional to the magnitude of the difference between the sequential off-time intervals.

For the present example, the boiler water temperature over time will be adjusted by the apparatus of the invention as shown by the solid trace in FIG. 2(c). The interval To5 is longer than To4 and the subsequent off-time intervals continue to increase as a result of the increasing outside temperature. Consequentially, a lower demand rate is indicated and the boiler water temperature set points are decreased by an amount proportional to the difference in off-times. As the outside temperature further increases, the intervals from To6 to To10 will progressively increase indicating further reduction in demand which results in further lowering the boiler water temperature set points causing a lowering of the average boiler water temperature over the period of warmer weather.

As the outdoor temperature begins to fall after interval To10, the subsequent intervals will become progressively shorter with decreasing outdoor temperature thereby indicating increasing heat demand rate. Thereafter, the boiler water temperature set points are increased in proportion to the increasing demand rates as indicated by the decreasing off-time intervals.

During extended periods of moderate weather, the boiler water temperature set points will be maintained at a preset minimum range typically 110° to 130° F. in a residential dwelling. That range may be too low for maintaining the hot water supply (HWS) at a desired specified level. The apparatus of this invention provides for the automatic adjustment of the boiler water temperature range during extended periods of moderate weather in order to satisfy the temperature requirements of the hot water supply.

Figure 3:
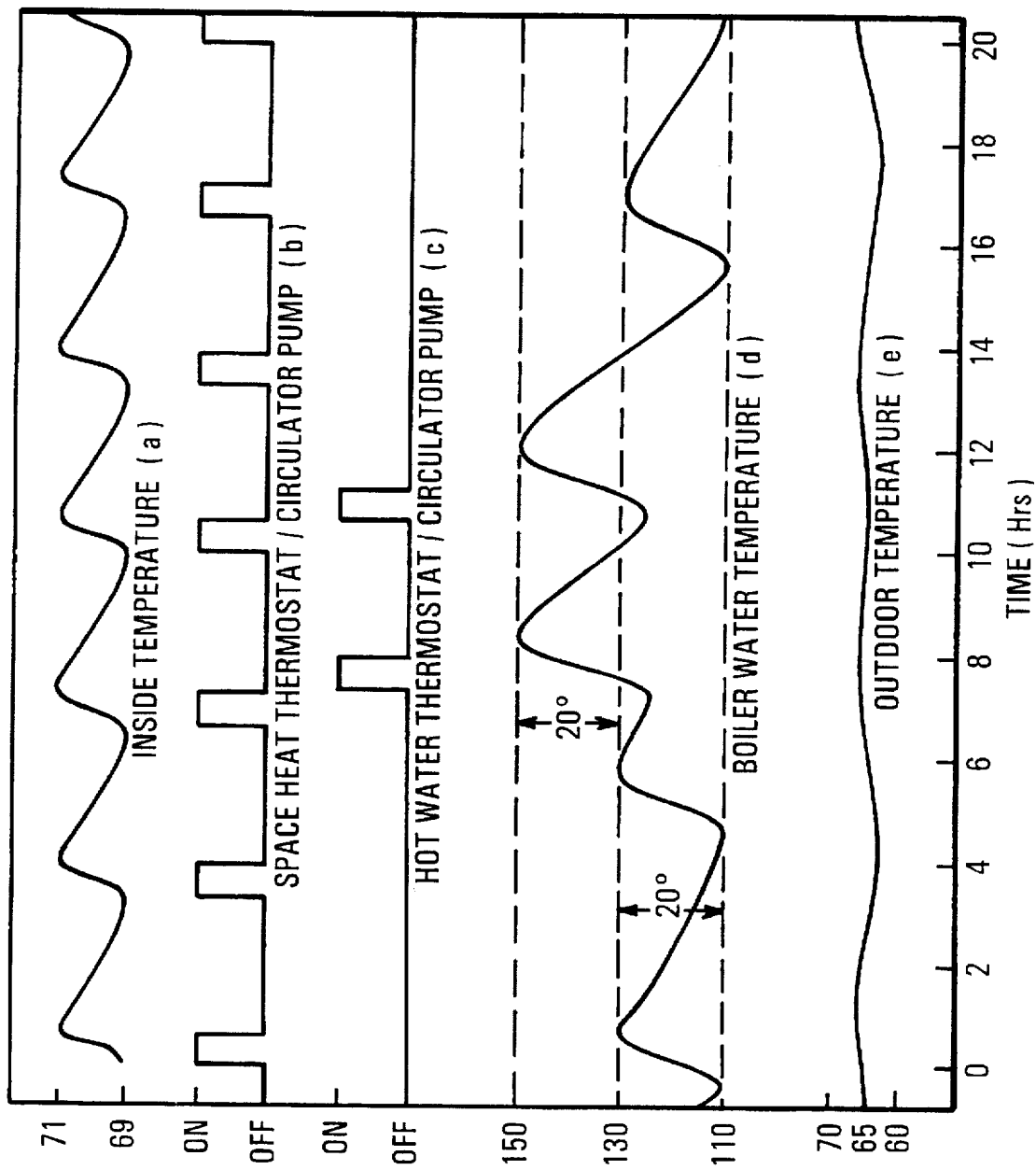
FIG. 3 illustrates, by way of example, typical operating conditions over a 16-hour period during which the outside temperature is high with very low demand on space heat and demand rate variances established by the demands of the separate hot water supply, both with and without the control apparatus of the invention.

FIG. 3 illustrates the operation of the system during periods of minimum space heat demand but with variable demand by the hot water supply with the apparatus of the invention installed. The outdoor temperature is shown nearly constant and close to the space thermostat set point of 70° F. for which case the space heat demand rate is at a minimum and the boiler water temperature set points are at the minimum range of 110° to 130° F. Since the space heat demand is nearly constant, the space thermostat off-time intervals will remain nearly constant and the apparatus would maintain the boiler water temperature set points at the minimum range in the absence of any other heat demand.

FIG. 3 represents the example in which there is a demand for hot water from the hot water system following a long period (shown as approximately six hours) of minimal demand for space heat. At the minimal demand rate for space heat the boiler water is at the minimum temperature range of 110° to 130° F. A demand for hot water from the hot water supply will be indicated by the action of the hot water supply thermostat or circulating pump control in FIG. 3(c). In this case, the apparatus will respond to the input from the hot water supply circulating pump control and automatically raise the boiler water temperature set points to the range desired for the hot water supply (130° to 150° F. for this example). Although the space heat demand remains constant (and low), the apparatus of the invention will, during periods of low space heat demand, maintain the boiler water temperature set points to a range desired for the hot water supply (130° to 150° F. for this example) as shown in FIG. 3(d). When the HWS (hot water supply) circulating pump turns off, the control system reverts back to the hot water temperature control for adjustments based on space heat demand rate.

What is claimed is:

1. A method for automatically adjusting the temperature of the boiler water in a hot water heating system, which includes a boiler and a control system for adjusting the boiler water temperature, in proportion to changes in the heat demand rate in the space heated by the boiler water wherein the change in heat demand rate is established on the basis of the off-time interval in the cyclic off and on activation of the pump which circulates the boiler water through heat radiators in the space being heated, the system does not require an outdoor temperature sensor, the method comprising: measuring the circulating pump off times; continuously measuring the boiler water temperature; calculating the change in space heat demand rates by calculating the change in the length of the off-time intervals of the circulating pump; and activating the boiler water control circuits to adjust the boiler water temperature control set points upward or downward in direct proportion to the change in the calculated space heat demand rate, whereby the boiler water temperature is automatically adjusted in relation to the heat loss rate of the space being heated.

2. The method of claim 1, wherein the measurement of the circulating pump off time intervals is obtained as an electrical signal within the circulating pump control system which can be any one of the following:

(a) the opening and closing of the electrical contacts of the thermostat in the heated space which activates the pump on/off control;

(b) the voltage input or output from any intermediate device connected between the thermostat contacts and the circulating pump motor, e.g., a control relay or other electrical actuator;

(c) the voltage applied directly to the circulating pump motor leads to actuate the pump on and off.

3. The method of claim 1, wherein the boiler water temperature is continuously measured and monitored by means of a conventional temperature sensor installed on the boiler such as to be in direct contact with the boiler water and wherein the output of the temperature sensor is an electrical signal, current or voltage, which is directly proportional to the boiler water temperature.

4. The method of claim 1, wherein the electrical signals corresponding to the measured off-time intervals of the circulating pump and the boiler water temperature are provided as inputs to an electronic control system in which changes in space heat demand rate are calculated and new boiler water temperature set points calculated in terms of the calculated change in the space heat demand and the measurement of the instantaneous boiler water temperature.

5. The method of claim 4, wherein the outputs of the electronic control system are two control signals, being the upper and lower boiler water temperature set points, which are fed to the control circuits of the boiler burner to control the burner on/off cycles such as to maintain the boiler water temperature within the set points calculated for the space heat demand rate at any point in time.

6. A control system for automatically adjusting the temperature of the boiler water in a hot water heating system, which includes a boiler, in proportion to changes in the heat demand rate in the space heated by the boiler water wherein the change in heat demand rate is established on the basis of the off-time interval in the cyclic off and on activation of the pump which circulates the boiler water through heat radiators in the space being heated, the control system does not require an outdoor temperature sensor, the control system comprising: means to measure the circulating pump off times; means to continuously measure the boiler water temperature; means to calculate the change in space heat demand rates by calculating the change in the length of the off-time intervals of the circulating pump; and means to activate the boiler water control circuits to adjust the boiler water temperature control circuits to adjust the boiler water temperature control set points upward or downward in direct proportion to the change in the calculated space heat demand rate, whereby the control system automatically adjusts the boiler water temperature in relation to the heat loss rate of the space being heated.

7. The control system of claim 6, for use in an existing or newly installed hot water heating system, comprising: an electronic control module having two inputs which are electrical signals indicative of (1) the circulating pump off time intervals and (2) the instantaneous boiler water temperature; and two output control signals to the existing boiler burner control circuits which serve to fire the boiler burner on and off such as to maintain the boiler water temperature between the upper and lower temperature set points calculated in the electronic control module on the basis of the instantaneous space heat demand rate as determined by the measured changes in the circulating pump off-time intervals.

8. The control system of claim 7, wherein the electronic control module is a self-contained unit in a single enclosure which includes: a central processing unit which comprises digital and/or analog circuits which is preprogrammed to continuously calculate changes in the off-time intervals of the hot water circulating pump and the boiler water temperature and therefrom calculate the maximum boiler water temperature set points which are sufficient to satisfy the instantaneous space heat demand rate; isolation circuits which electrically isolate the control module circuits from the circulating pump control circuits; signal conditioning circuits which convert the outputs from the aforementioned isolator circuits to signal levels (voltages or currents) compatible with the specific design for the central processing unit; temperature interface circuit to convert the output from the boiler water temperature sensor to a signal (voltage or current) proportional to boiler water temperature; a power supply to convert an AC voltage from an external power source to a DC voltage compatible with the requirements of the central processing unit and all other circuitry in the electronic module; electrical driver circuits to provide drive power to control relays or switches operated from the low-power central processing unit; and relays or switches which provide command signals to the boiler controls at the new temperature set points.

9. The control system of claim 6, wherein there is an additional control circuit in the central processing unit which monitors the domestic hot water circulator and during periods of low space heating demand, at which times the boiler water temperature would be inadequate to satisfy the domestic hot water requirement, raises the boiler water temperature to a range which is appropriate during the period of domestic hot water circulator operation.

* * * * *